United States Patent
Samukawa et al.

[19]
[11] Patent Number: 5,946,923
[45] Date of Patent: Sep. 7, 1999

[54] AIR CONDITIONING SYSTEM FOR VEHICLE

[75] Inventors: Katsuhiko Samukawa, Oobu; Yuji Honda, Okazaki; Masafumi Kawashima, Kariya; Yutaka Hirose, Nagoya, all of Japan

[73] Assignee: Denso Corporation, Kariya, Japan

[21] Appl. No.: 08/956,568

[22] Filed: Oct. 23, 1997

[30] Foreign Application Priority Data

| Feb. 6, 1987 | [JP] | Japan | 9-024150 |
| Oct. 25, 1996 | [JP] | Japan | 8-284441 |
| Dec. 24, 1996 | [JP] | Japan | 8-343608 |

[51] Int. Cl.$^6$ ........................ B60H 1/00
[52] U.S. Cl. .............. 62/133; 62/244; 236/49.3; 454/75; 165/249
[58] Field of Search ............ 236/49.3; 454/75, 454/74, 139; 62/244, 133, 179, 186; 165/43, 42, 202, 204, 248, 249

[56] References Cited

U.S. PATENT DOCUMENTS

| 4,458,583 | 7/1984 | Fukui et al. | 236/49.3 X |
| 4,478,049 | 10/1984 | Fukui et al. | 62/224 X |
| 5,320,577 | 6/1994 | Tooru et al. | 454/75 |
| 5,670,714 | 9/1997 | Sorensen | 454/75 X |

FOREIGN PATENT DOCUMENTS

| B2-47-36974 | 9/1972 | Japan . |
| B2-64-3687 | 1/1989 | Japan . |
| A-8-58350 | 3/1996 | Japan . |

*Primary Examiner*—Harry B. Tanner
*Attorney, Agent, or Firm*—Harness, Dickey & Pierce, PLC

[57] ABSTRACT

An air conditioning system for a vehicle is composed of a control unit which controls an air switching door, an element for detecting a clean-air level of the outside air and a vehicle speed sensor. The control unit controls the air-switching door to set to the outside-air mode when the clean-air level is higher than a reference level and to the inside-air mode when the clean-air level is not higher than the reference level. The control unit holds the inside-air mode until the vehicle speed becomes higher than a predetermined speed irrespective of the clean-air level.

27 Claims, 14 Drawing Sheets

AIR BLOW TEMP.

5,946,923

AIR CONDITIONING SYSTEM FOR VEHICLE

CROSS REFERENCE TO RELATED APPLICATION

The present application is based on and claims priority from Japanese Patent Applications Hei 8-284441 filed on Oct. 25, 1996, Hei 8-343608 filed on Dec. 24, 1996, and Hei 9-24150, filed on Feb. 6, 1997, the contents of which are incorporated herein by reference.

BACKGROUND OF THE INVENTION

1. Field of the Invention

The present invention relates to an air conditioning system for a vehicle, particularly an air conditioning system which changes air introduced from outside (hereinafter referred to as the outside-air mode) to air inside a vehicle compartment (hereinafter referred to as the inside-air mode) when the outside air is polluted or noxious.

2. Description of the Related Art

Air conditioning systems disclosed in JP-B2-64-3687 and JP-B2-47-36974 are provided with a gas sensor which detects polluted air and a control unit which controls an air switching door. When the outside air is polluted to a certain extent, the control unit drives the air switching door to change the outside-air mode to the inside-air mode.

When an automobile vehicle (hereinafter referred to as the front vehicle) is running in front of our vehicle, the gas sensor detects the exhaust gases emitted by the front vehicle—which is much more than the exhaust gases emitted while the engine is idling—so that the control unit selects the inside air mode. If the front vehicle stops at the red traffic light with the engine being idling, the exhaust gases is reduced so that the inside air mode is changed to the outside air mode by the control unit. However, the driver is apt to feel that the outside air is still polluted by the front vehicle, and wants to change the outside air mode to the inside air mode. Thus, operation of the control unit makes the driver uncomfortable.

SUMMARY OF THE INVENTION

The present invention has an object to prevent a driver from feeling uncomfortable even when the driver is waiting behind the front vehicle.

According to the present invention, an air conditioning system for a vehicle comprises an air conditioner having an air-switching door which provides an outside air mode and an inside-air mode, a first means for controlling the air switching door, a second means for detecting a clean-air level of outside air and a vehicle speed sensor. The first means controls the air-switching door to set to the outside-air mode when the clean-air level is higher than a reference level and to the inside-air mode when the clean-air level is not higher than the reference level. The first means also holds the inside-air mode until the vehicle speed becomes higher than a predetermined speed irrespective of the clean-air level.

The first means may increase the reference level as the vehicle speed decreases. The air conditioning system may be provided with a humidity detecting means so that the first means changes the reference level in response to the humidity. The humidity detecting means may be a means for detecting the rate of operation of the refrigerant compressor so that the humidity of the outside air can be estimated from an outside air temperature and the rate of operation of the refrigerant compressor. The humidity detecting means may be a wiper switch for the vehicle. In this case, the first means changes the reference level when the wiper switch is turned on.

Another object of the present invention is to provide an inexpensive air conditioning system which changes over from the outside air mode to the inside air mode in a short time.

According to the present invention, the air conditioning system comprises an air conditioner having an air-switching door which provides an outside air mode introducing outside air, an inside-air mode introducing inside air and a medium-air mode, a first means for controlling the air switching door, a second means for detecting a clean-air level of outside air and a vehicle speed sensor. The first means controls the air-switching door to set to the inside-air mode when the clean-air level is not higher than a reference level and to the medium-air mode when the clean-air level is higher than the reference level.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

First Embodiment

Figure 1:
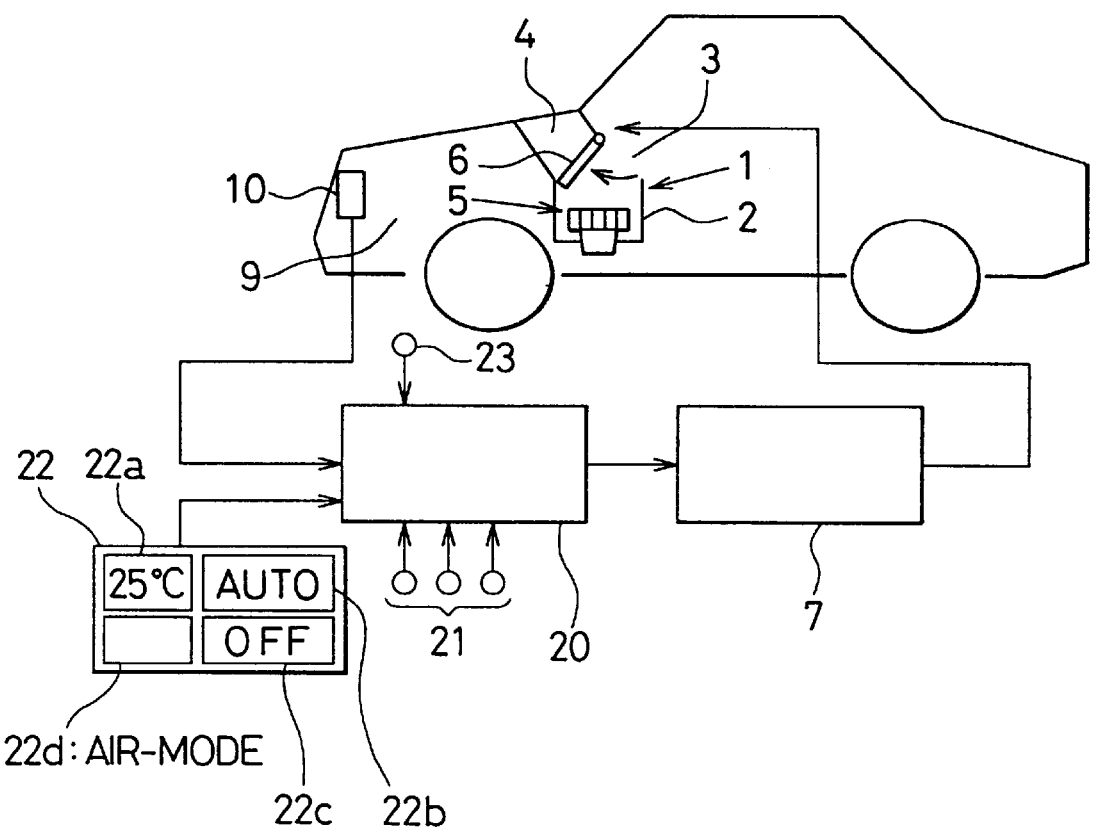
FIG. 1 is a schematic diagram illustrating an air conditioning system according to first and second embodiments of the present invention.
Figure 2:
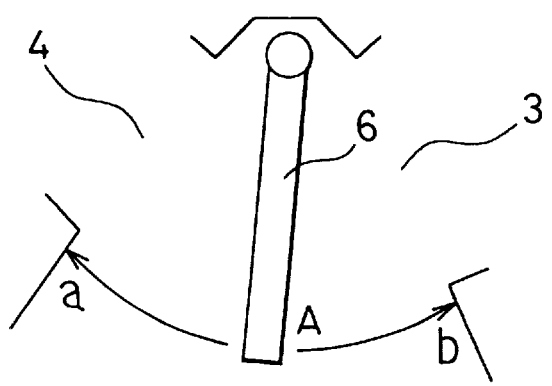
FIG. 2 is an air switching door of the air conditioning system according to the first and second embodiments.

An air conditioning system according to a first embodiment is described with reference to FIGS. 1 and 2.

The air conditioning system is composed of a common type air conditioner 1 which has a case 2 and various sensors 21, a control panel 22 and a control unit 23, which are described below. The case 2 has an inside-air inlet 3 and an outside-air inlet 4 at upper portions thereof. The air conditioner 1 has an air blower 5, a common type air switching door 6 made of a plate member (a flexible film type or rotary type is also applicable) and a servomotor 7 in the case 2. The air conditioner 1 takes inside-air from the inside-air inlet 3 and outside air in the case 2 from the outside-air inlet 4 at a desired ratio by turning the air switching door by the servomotor 7 between a position a and a position b as indicated by arrows A in FIG. 2. When the air switching door 6 moves to the position a, the outside-air inlet is fully closed and the inside-air inlet is fully opened (hereinafter referred to as the inside air mode). On the other hand, when the air switching door moves to the position b, the outside-air inlet is fully opened and the inside-air inlet is fully closed. The servo motor 7 is controlled by a control unit 20 (described below). The air conditioner 1 has an evaporator (not shown), a heater core (not shown) and a plurality of air passages open to the driver, passengers and wind-shield glasses.

A gas sensor 10 is disposed in the engine compartment 9 of a vehicle. The gas sensor is composed of a common semiconductor element which can detect a gas such as CO, HC or other noxious gas included in the engine exhaust gases and a heater for heating the element to accelerate the sensing performance thereof. The gas sensor 10 generates a lower output voltage VDGS as the concentration of the noxious gases increases.

The control unit 20 is a computer having a RAM and a ROM and is powered when the ignition switch is turned on. The control unit 20 has input terminals connected to the gas sensor 10, other sensors 21 including an inside-air temperature sensor and an outside-air temperature sensor, a vehicle speed sensor and various components of a control panel 22, such as a temperature setting unit 22a, a switch (hereinafter referred to the AUTO switch) 22b for automatic control of the air conditioner 1, a switch (OFF switch) 22c and an air-mode changing switch 22d. When the AUTO switch 22b is turned on, the air blower 5 is operated. The control unit 20 has output terminals connected to the air blower 5 and the servomotor 7.

The operation of the air-switching door 6 when the ignition switch is turned on and the AUTO switch 22b is turned on is described with reference to a flow chart shown in FIG. 3. In step S10, the initialization is carried out, flags are reset and the gas sensor 10 is warmed to be activated. The gas sensor 10 is warmed for about 30 seconds while the air conditioner 1 is operating in the inside-air mode. Then, the control step proceeds to S20, where a reference voltage VCLR corresponding to a noxious gas concentration in a cleanest outside air is set. The gas sensor 10 generates a reference voltage VDGS corresponding to an actual noxious gas concentration. The relationship between the reference voltage VCLR and the actual voltage VDGS is expressed as follows:

$$VCLR \leftarrow \max(VCLR, VDGS) \quad (1)$$

In step S30, VDGS is read, and an actual clean ratio Ln is calculated in step S40. The ratio is expressed as follows:

$$Ln = VDGA/VCLR \quad (2)$$

Since the voltage VDGS decreases as the noxious gas concentration increases, the actual clean ratio Ln increases as the noxious gas concentration decreases.

Figure 4:
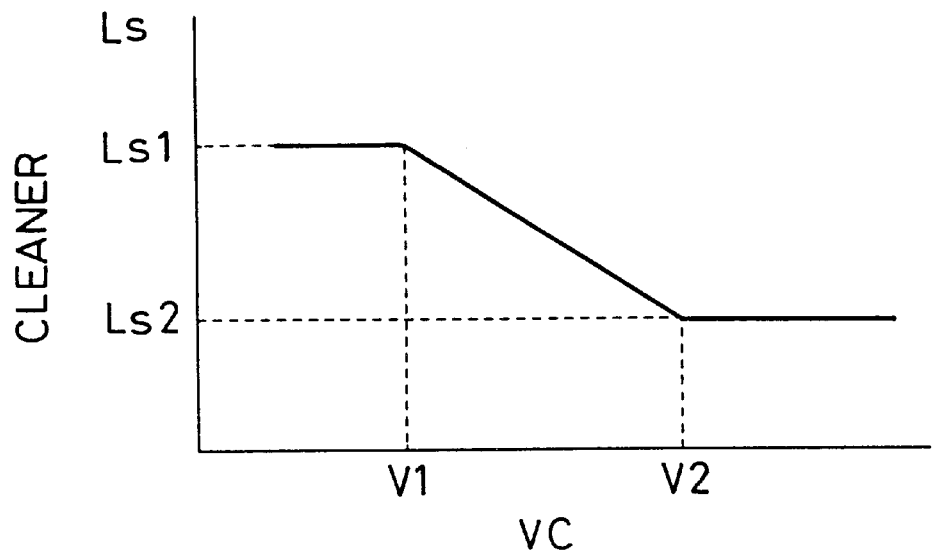
FIG. 4 is a graph showing relationship between the vehicle speed and reference clean air levels.
Figure 5:
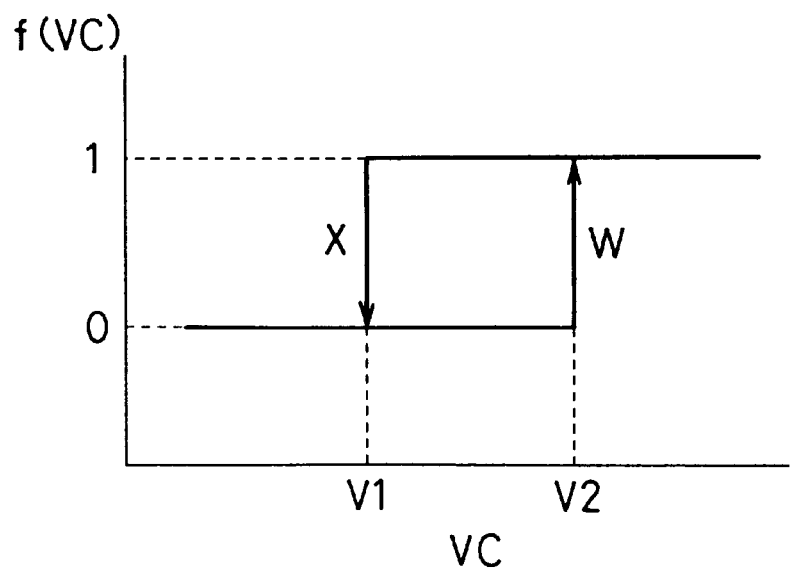
FIG. 5 is a graph showing relationship between vehicle-speed flag and the vehicle speed.

In step S50, a reference clean-air level Ls is set. If the actual clean ratio Ln is smaller than the reference clean-air level Ls, the outside-air mode of the air conditioner 1 is changed to the inside-air mode. On the other hand, if the actual clean ratio Ln is larger than the reference clean-air level Ls, the inside-air mode is changed to the outside-air mode. The actual clean ratio Ln is lowered as the vehicle speed VC increases in a speed range between V1 and V2 as shown in FIG. 4. The actual clean ratio Ln in the speed range lower than V1 is a constant value Ls1, and the actual clean ratio Ln in the speed range higher than V2 is constant value Ls2. Thus, the inside-air mode is more likely to be set when the vehicle runs at a low speed, and the outside-air mode is more likely to be set when the vehicle runs at a high speed. In step S60, whether the flag f(vc) is set to 1 or not is examined. The flag f(vc) is set and reset according to the vehicle speed along a hysteresis loop shown in FIG. 5. When the vehicle speed VC increases from a speed lower than a lower speed V1, the flag f(vc) is set at the higher speed V2. On the other hand, when the vehicle speed VC decreases from a speed higher than a higher speed V2, the flag f(vc) is reset (or set to 0) at the lower speed V1. If the flag f(vc) is set, it indicates that the vehicle runs at a high speed. On the other hand, if the flag f(vc) is reset, it indicates that the vehicle runs at a low speed.

If the vehicle runs at a low speed, the control step goes to S70, where whether a flag RECF is set or not is examined. If the flag RECF is set, it indicates that the air conditioner 1 is operated in the inside-air mode. On the other hand, if the flag is reset, it indicates that the air conditioner is operated in the outside-air mode. When the control unit is turned on, it controls the air conditioner 1 to operate in the inside-air mode, so that the flag RECF is reset (or set to zero), and step S70 provides NO. Then step S80 follows to compare the actual clean ratio Ln with the reference clean-air value Ls. If the actual clean ratio Ln is equal to or less than the reference clean-air level Ls, the control step goes to step S90, where a timer is reset. Then, step S100 follows to control the servo motor 7 to move the air-switching door 6 from the outside-air-mode position b to the inside-air-mode position a and to set the flag RECF. on the other hand, if the actual clean ratio Ln is not equal or not less than the reference clean-air value Ls, the control step goes to step S110, where the timer starts counting, and goes to step S120. In step S120, whether the flag RECF is set or not is examined. When the air conditioner 1 is started, the flag RECF is not set and, therefore, the control step goes to step S140. In step 140, the servomotor is controlled to move the air-switching door to the outside-air mode position b.

If the outside air is polluted or noxious, the flag RECF is set in step S100. If the outside air become clean thereafter, it is examined in step S120, where YES is provided to proceed to step S130. Step 130 maintains the inside-air mode (S100) until the timer, which starts in step S110, measures time T longer than Ti (e.g. 3 sec.). If the air-mode changing switch 22d is manually operated to select one of the outside-air mode and the inside-air mode, the above steps are not performed.

Figure 3:
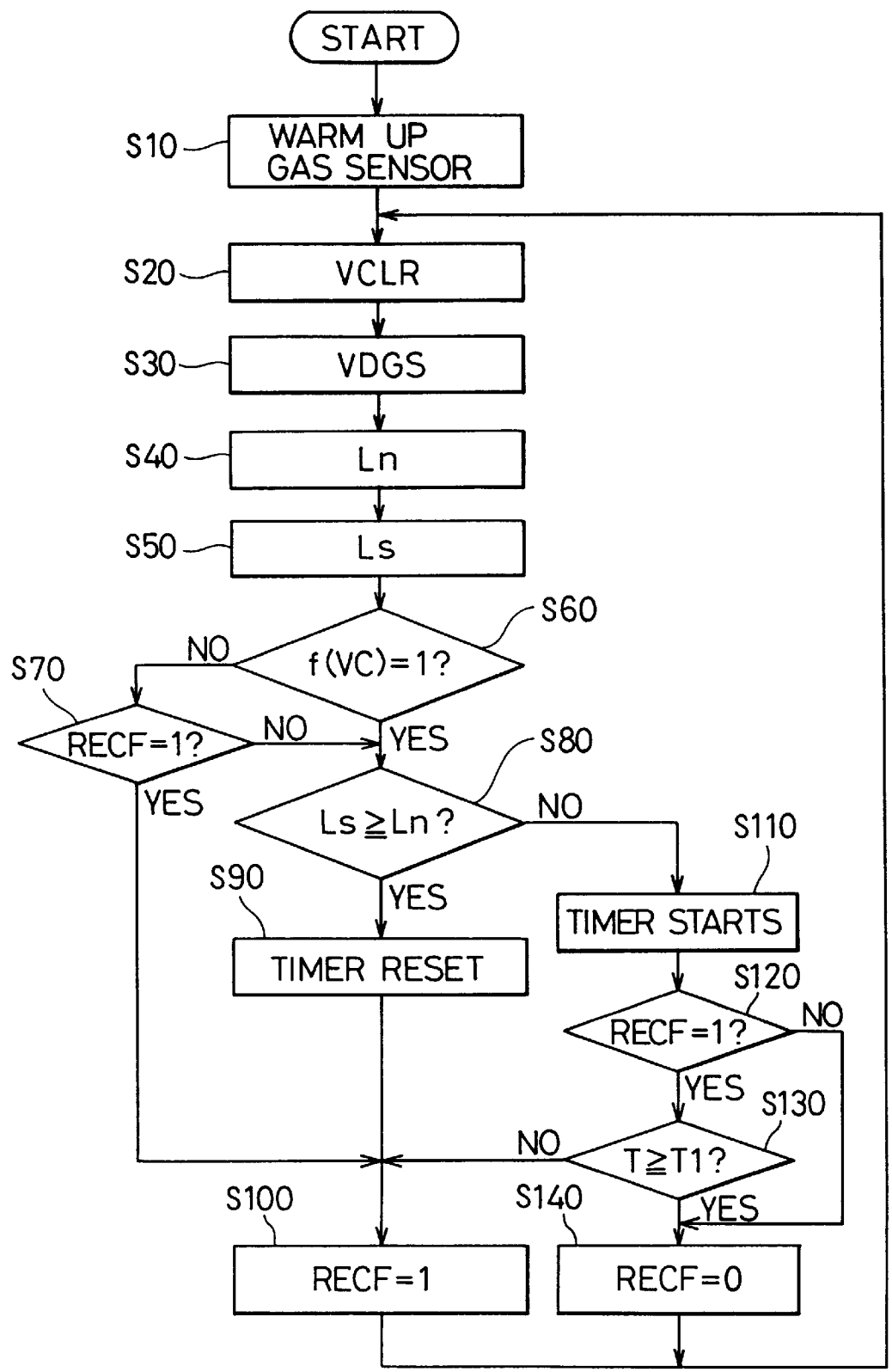
FIG. 3 is a flow chart of operation of a control unit according to the first embodiment.

When the control steps of the flow chart shown in FIG. 3 is started, and proceed to step S50, the reference clean-air value Ls is set in connection with the vehicle speed VC. If the vehicle runs at a low speed, the control step goes to step S70, where No is provided (because the outside air is clean at starting time). Therefore, the control step goes to step S80 to examine whether the outside air is clean or not. This step S80 also follows after step S60 if the vehicle runs at a high speed. If the outside air is decided to be polluted in step S80, and the air conditioner 1 is operated in the inside-air mode (S100).

Thereafter, if the vehicle runs at a low speed and, also, step S60 provides NO, step S70 provides YES because the flag RECF has been set in step S100 previously. Therefore, the control step goes to step S100, and the inside-air mode is maintained.

Thus, if a front vehicle exists when our vehicle stops, the inside-air mode is not changed to the outside-air mode.

On the other hand, if the air conditioner 1 is operated in the outside-air mode while the vehicle runs at a low speed, step S70 provides NO, and step S80 follows. If the outside air is clean, step 80 provides NO to maintain the outside-air mode. On the other hand, if the outside air is polluted, step S80 provides YES to change the outside-air mode to the inside-air mode.

If the air conditioner has been operated in the inside-air mode and step S120 provides YES, the control step goes to step S130 and to step S100 as long as the timer has not measured the time T1, so that the air switching door 6 can be prevented from hunting.

Second Embodiment

Figure 6:
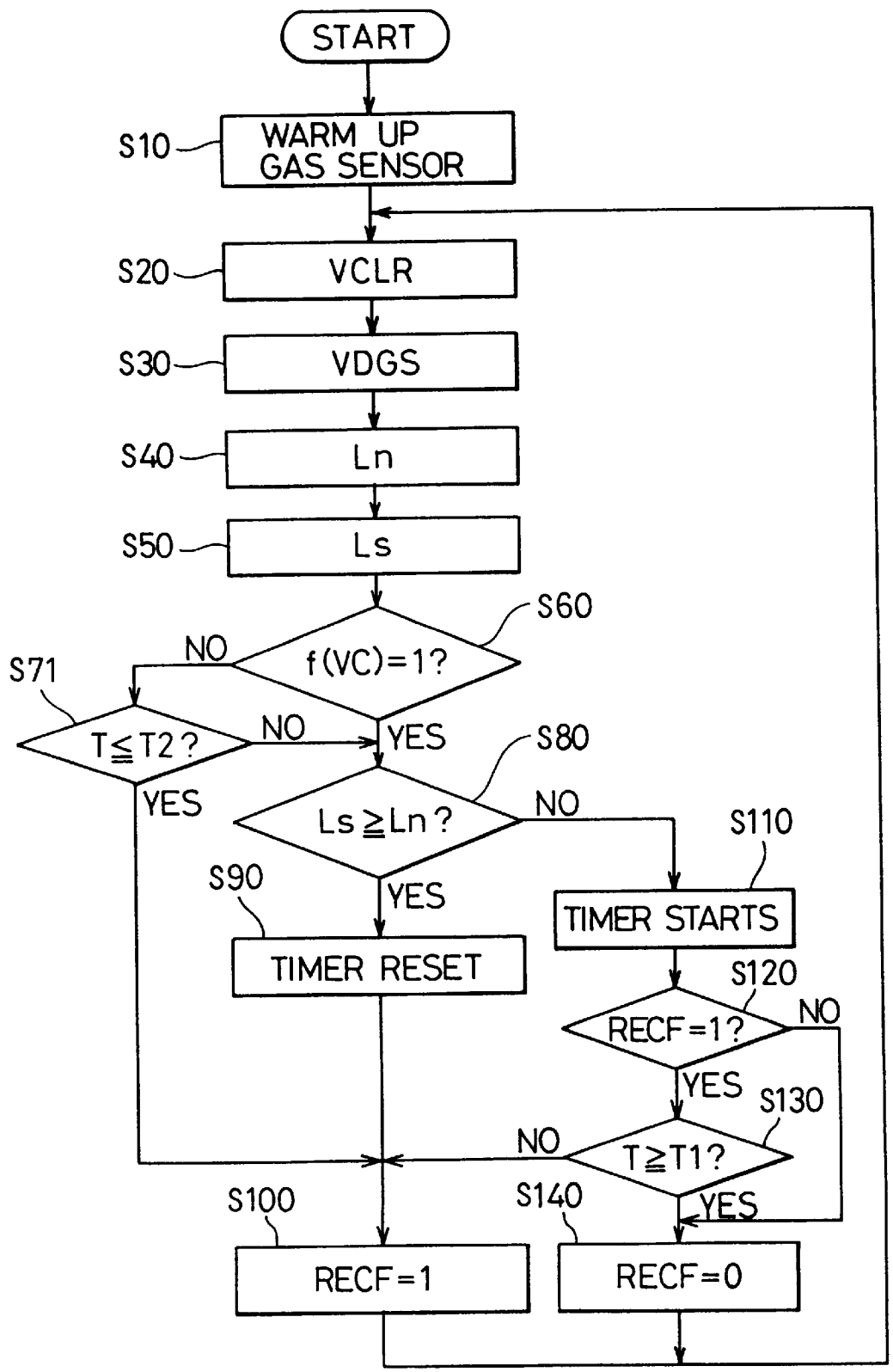
FIG. 6 is a flow chart of operation of the control unit according to a second embodiment of the present invention.

An air conditioning system according to a second embodiment is described with reference to a flow chart shown in FIG. 6. Step S70 of the first embodiment is replaced with step S71.

If the vehicle runs at a low speed, step S60 provides NO, and step S71 follows. In step S71, lapse of time T after the vehicle runs at a low speed is counted. If the lapse of time T is equal to or shorter than T2, step S71 provides YES. Thus, the inside-air mode is maintained. (S100). That is, as long as the vehicle runs at a low speed, the inside-air mode is maintained at least during the time period T2. If the lapse of time T is longer than T2, step S71 provides NO, and step S80 follows to change the inside-air mode to the out-side air mode if the outside air is clean. Although the reference clean-air value Ls is changed with the vehicle speed in the first embodiment, it can be fixed in this embodiment.

Third Embodiment

Figure 7:
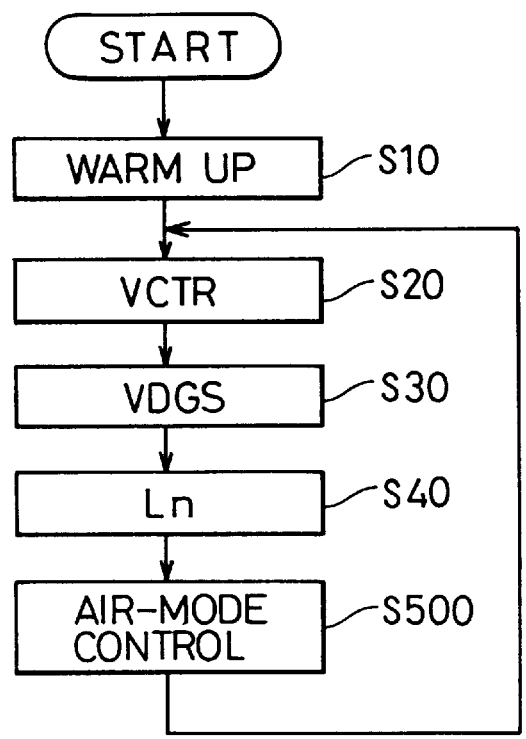
FIG. 7 is a flow chart of operation of the control unit according to a third embodiment of the present invention.
Figure 8:
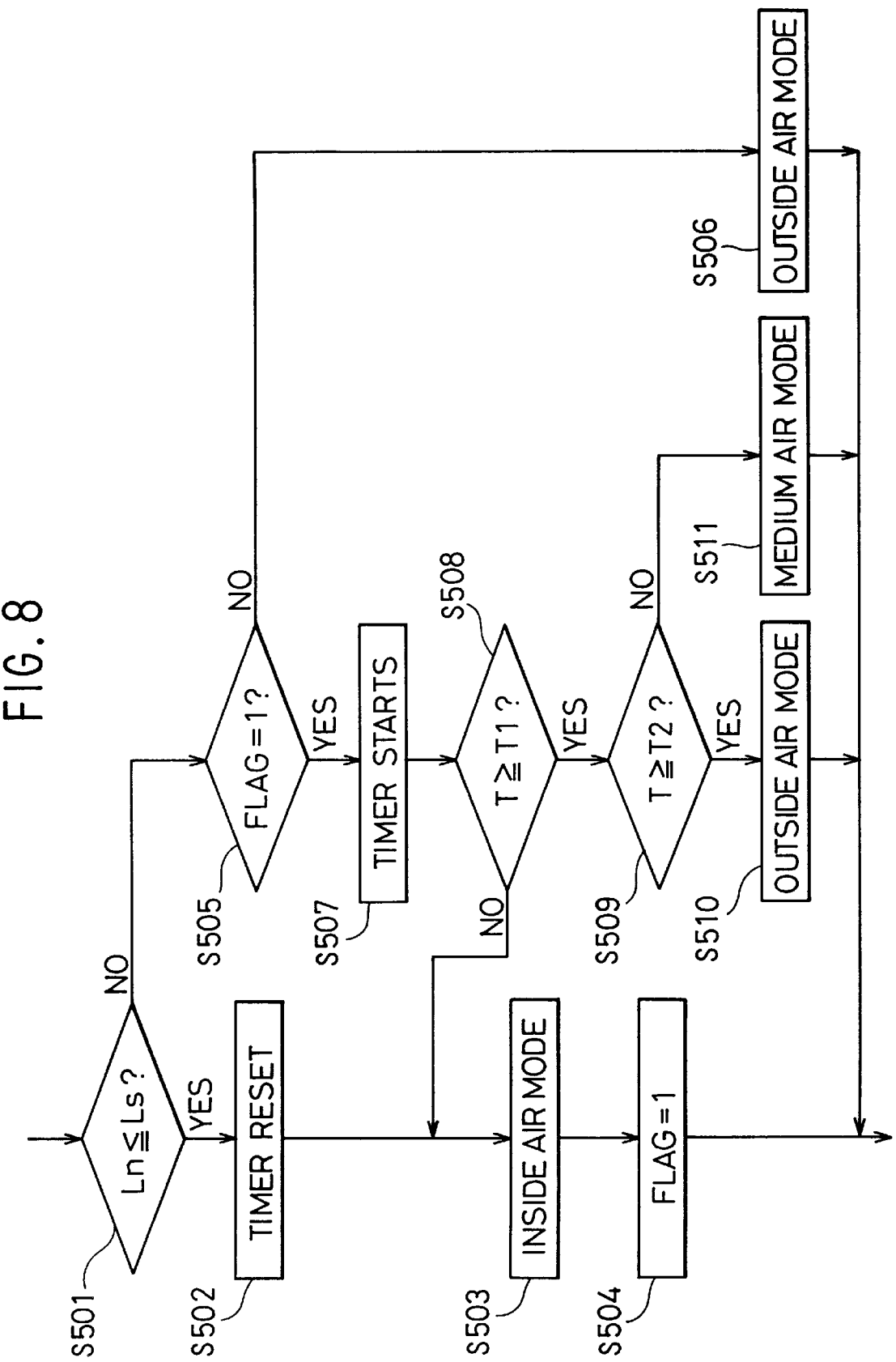
FIG. 8 is a flow chart of the operation of the control unit according to the third embodiment.

An air conditioning system according to a third embodiment of the present invention is described with reference to FIGS. 7 and 8. Steps S10–S40 are the same as the embodiments described above. If the air-mode changing switch 22d selects the manual operation, the following steps are not performed.

In step S501, the actual clean ratio Ln is compared with the reference clean-air value Ls. If the actual clean ratio Ln is equal to or smaller than the reference clean-air value Ls, step S501 provides YES and the control step goes to step S502 to reset a timer. Then step 503 follows to set the air-mode to the inside-air mode. Subsequently, a flag (hereinafter referred to as Flag) is set in step S504. On the other hand, if the actual clean level Ln is larger than the reference clean-air value Ls (that is, the outside air is clean), the control step proceeds to step S505. Step S505 provides NO just after the ignition switch is turned on since Flag has been reset (or set to 1) in step S100. Thereafter, step 506 follows to set the air mode to the outside-air mode.

If it is once decided that the outside air is polluted in step S501 and, also, the inside-air mode is set in step S503, the Flag is set in S504, and step S505 provides YES. Thereafter, step S507 follows to set the timer which has been reset in step S502. In step S508, whether the timer has measured a first lapse of time T1 (e.g. 10 seconds) or not is examined. If the result is NO, step S503 follows. On the other hand, if the result is YES, the control step goes to step S509 to measure a second lapse of time T2 (e.g. 60 seconds). If the timer has measured the second lapse of time T2, step S509 provides YES and step S510 follows to set the air mode to the outside-air mode. If step 509 provides NO, step S511 follows to change the air mode to a medium-air mode, in which the air-switching door 6 is positioned in the middle (between the positions a and b in FIG. 2).

Figure 9:
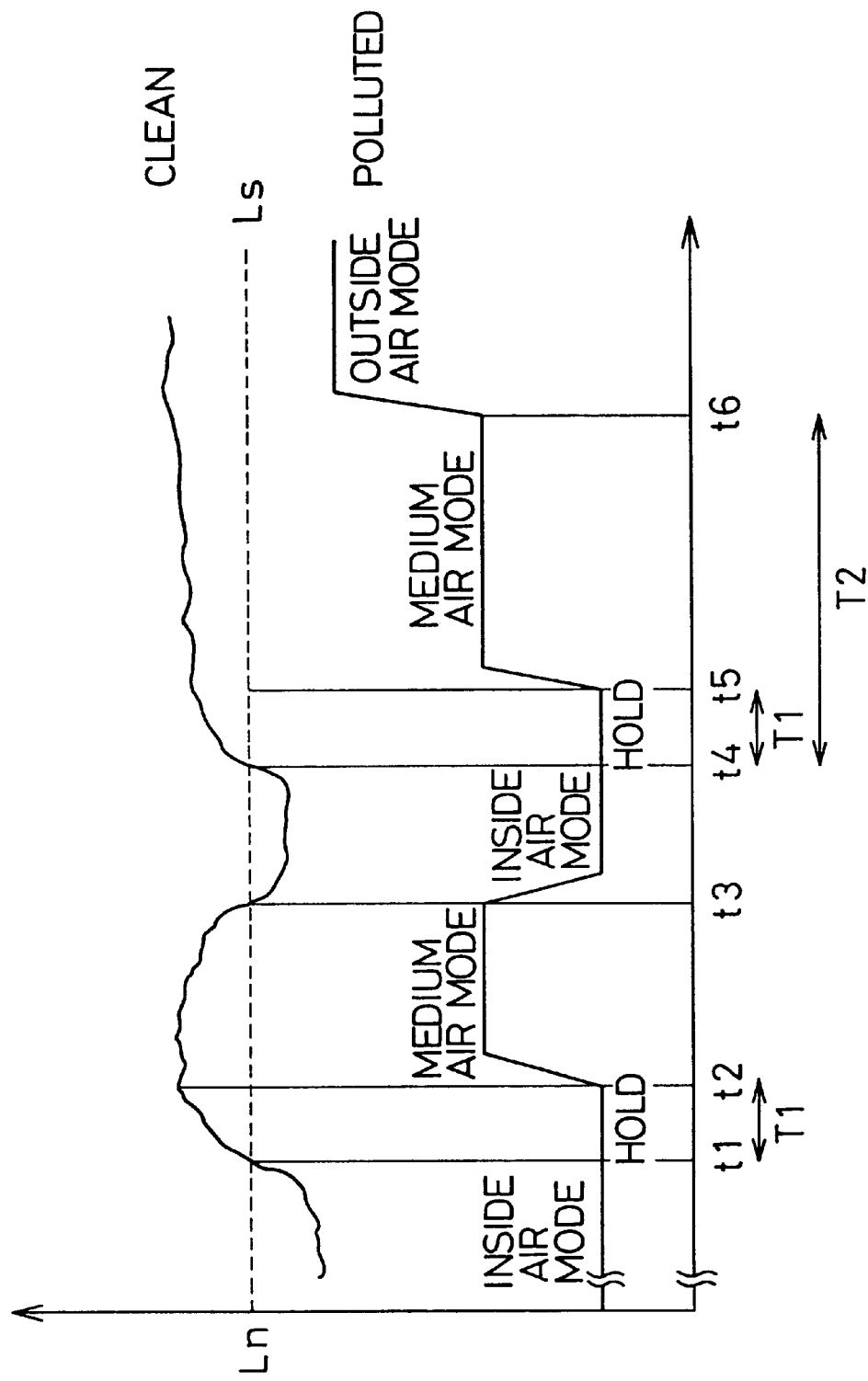
FIG. 9 is a time chart of the operation of the control unit according to the third embodiment.

The above operation is described in sequence with reference to a flow chart shown in FIG. 9.

When the outside air is polluted before time t1, the inside-air mode is set. When the outside air becomes clean after time t1, the mode is set to the medium-air mode after lapse of time T1. Thus, the inside-air mode is maintained for a period T1 before it is changed to the medium-air mode at t2. If the outside air becomes polluted at time t3 (e.g. 40 seconds after t2), the medium-air mode is changed to the inside-air mode. Thus, the air mode can be changed in a short time.

Thereafter, if the outside air becomes clean at time t4, the inside-air mode is maintained for the period T1 until it is changed to the medium air mode at time t5. If the outside air keeps clean for a period T2 from time t5 to time t6, the medium air mode is changed to the outside-air mode.

The inside-air mode can be changed gradually to the medium-air mode in the period T1 before time t2 or t5 and, also, the medium-air mode can be changed gradually to the outside-air mode for the period T2 before time t6.

The medium-air mode can be set so that the air-switching door 6 is positioned to introduce a suitable ratio of the outside air according to the degree of pollution of the outside air or running conditions, such as running in town or out of town. For example, 80% of the air introduced into the air conditioner 1 can be the outside air while the vehicle is running out of town, and 80% of the air introduced into the air conditioner can be the inside air while the vehicle is running in town.

The outside air can be introduced if the outside temperature is low and the windshield glass is apt to get fogged. In such conditions, the periods T1 and T2 can be reduced.

If the temperature of the inside air is very high, the medium-air mode can be changed to the outside-air mode to cool the passenger compartment in a short time.

The air mode can be changed between two modes, the inside-air mode and the medium-air mode instead of the three modes which also include the outside-air mode.

Fourth Embodiment

An air conditioning system according to a fourth embodiment of the present invention is described with reference to FIGS. 10–20.

Figure 10:
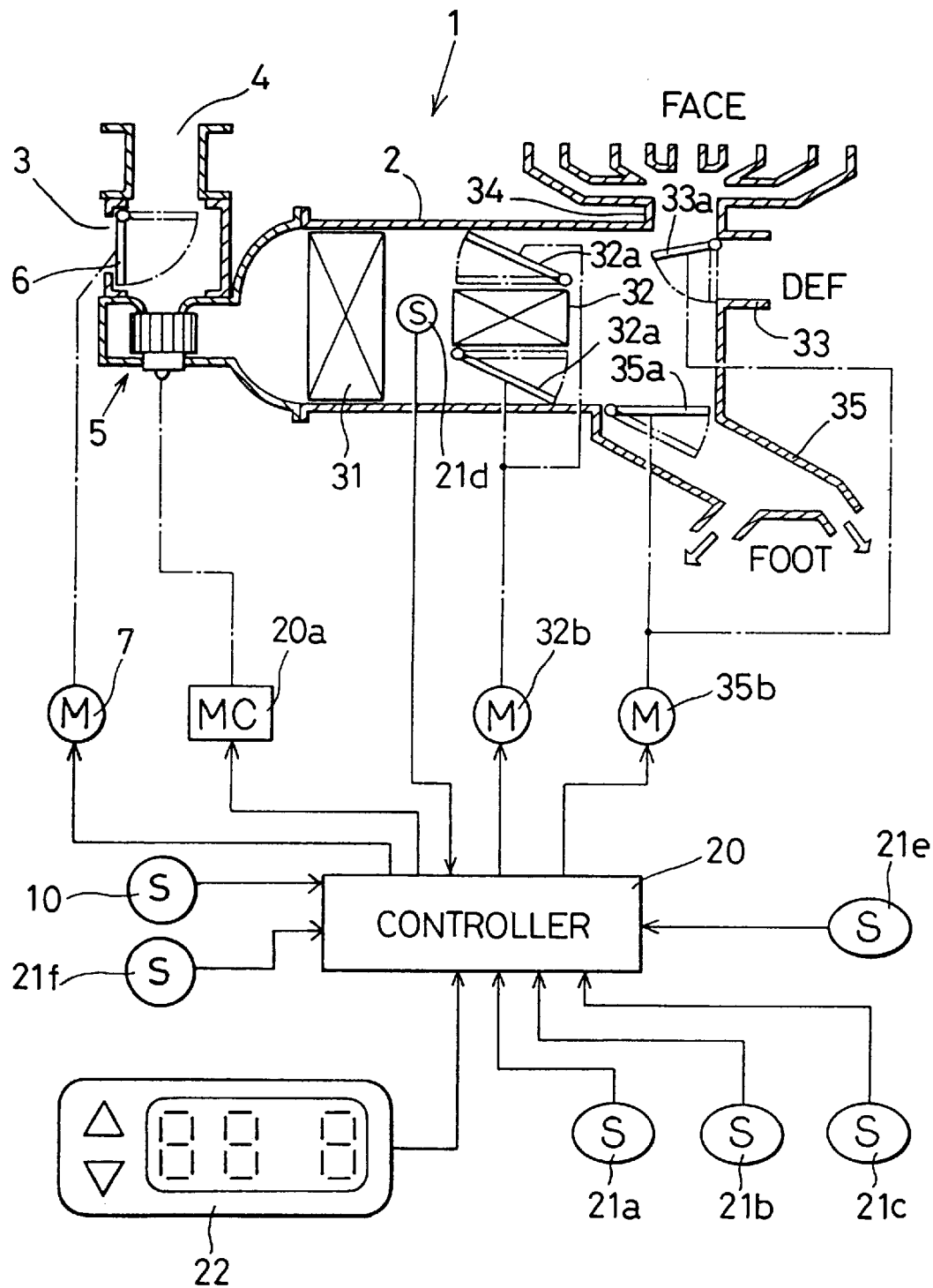
FIG. 10 is a schematic diagram of an air conditioning system according to a fourth embodiment of the present invention.

As shown in FIG. 10, an air conditioning system has an air conditioner 1, a control unit for controlling the air conditioner 1, a control panel 22 and various sensors which are discussed below. The air conditioner 1 is composed of a case or an air duct 2, an air blower 5, an air switching door 6, a cooler 31, a heater 32. The air switching door 6 which is driven by a servomotor 7. The air switching door operates in the same manner as described in the air conditioning system according to the first embodiment. The case 2 has a defroster duct 33, a face duct 34 and foot duct 35 and switching doors 33a and 35a thereof, which are driven by a servomotor 35b.

The cooler 31 is a common evaporator, and the heater 32 is a common core member to which the engine cooling water is supplied. A pair of air mix doors 32a are disposed on the opposite sides of the heater 32 to be driven by a servomotor 32b.

The control unit 20 has a microcomputer, and connected to an inside-air temperature sensor 21a, an outside-air temperature sensor 21b, a solar radiation sensor 21c, a cooling-air temperature sensor 21d, an engine-cooling-water temperature sensor 21e, the gas sensor 10, a humidity sensor 21f and the control panel 22. The control unit 20 controls the servomotors 7, 32b, 35b and a motor driving circuit 20a to drive various members including the air blower 5 and the doors 6, 32a, 33a, and 35a according to programs installed into the control unit 20 beforehand.

Figure 11:
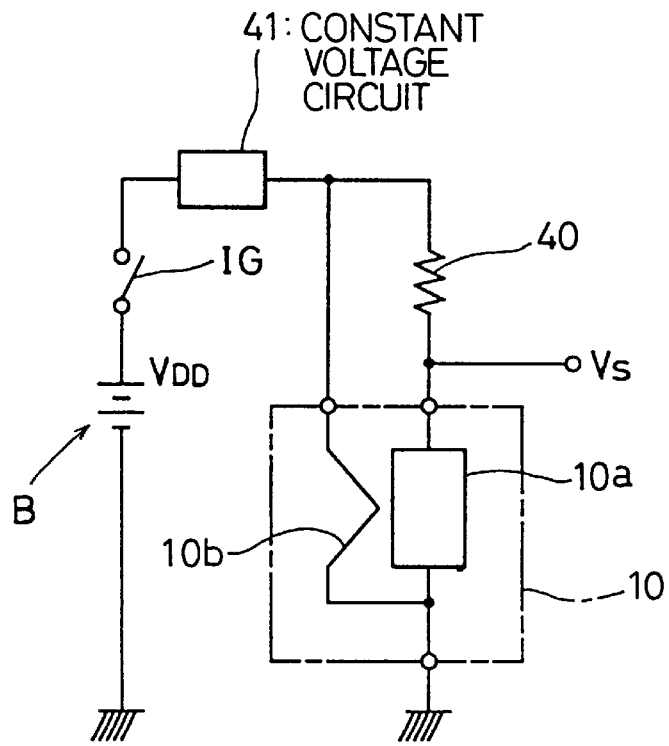
FIG. 11 is an electric circuit diagram connected to a sensor of the air conditioning system according to the fourth embodiment.
Figure 12:
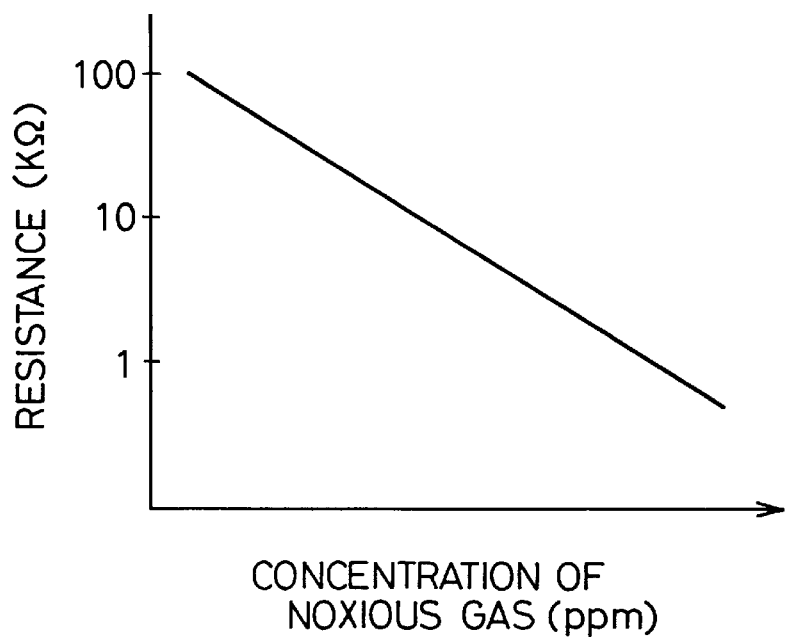
FIG. 12 is a graph showing characteristics of a gas sensor used in the fourth embodiment.

The gas sensor 10 is composed of a metal oxide (e.g. $SnO_2$) semiconductor element 10a and a heater 10b for heating the element 10a to an activation temperature (e.g. 200–450° C.), and is connected to a battery B through a constant voltage circuit 41 and a resistor 40 as shown in FIG. 11. The resistance of the gas sensor 10 lowers when the concentration of a noxious gas increases. Accordingly, the terminal voltage of the gas sensor 10 lowers as the noxious gas increases. The gas sensor 10 is disposed at a well ventilated place in the engine compartment.

The humidity sensor 21f is disposed near the gas sensor 10 to detect the relative humidity of the outside air therearound.

Figure 13:
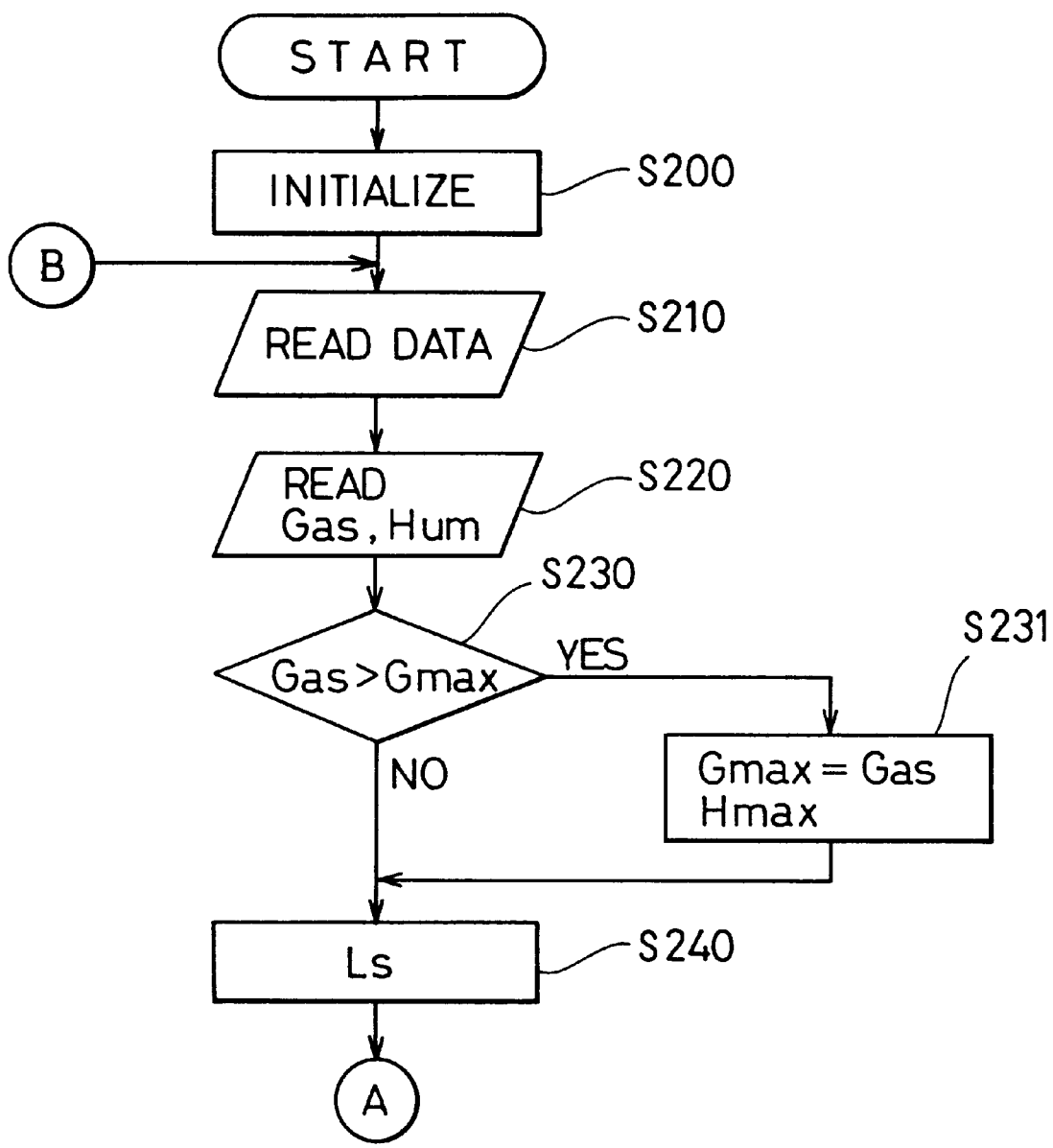
FIG. 13 is a flow chart of the operation of the control unit according to the fourth embodiment.
Figure 14:
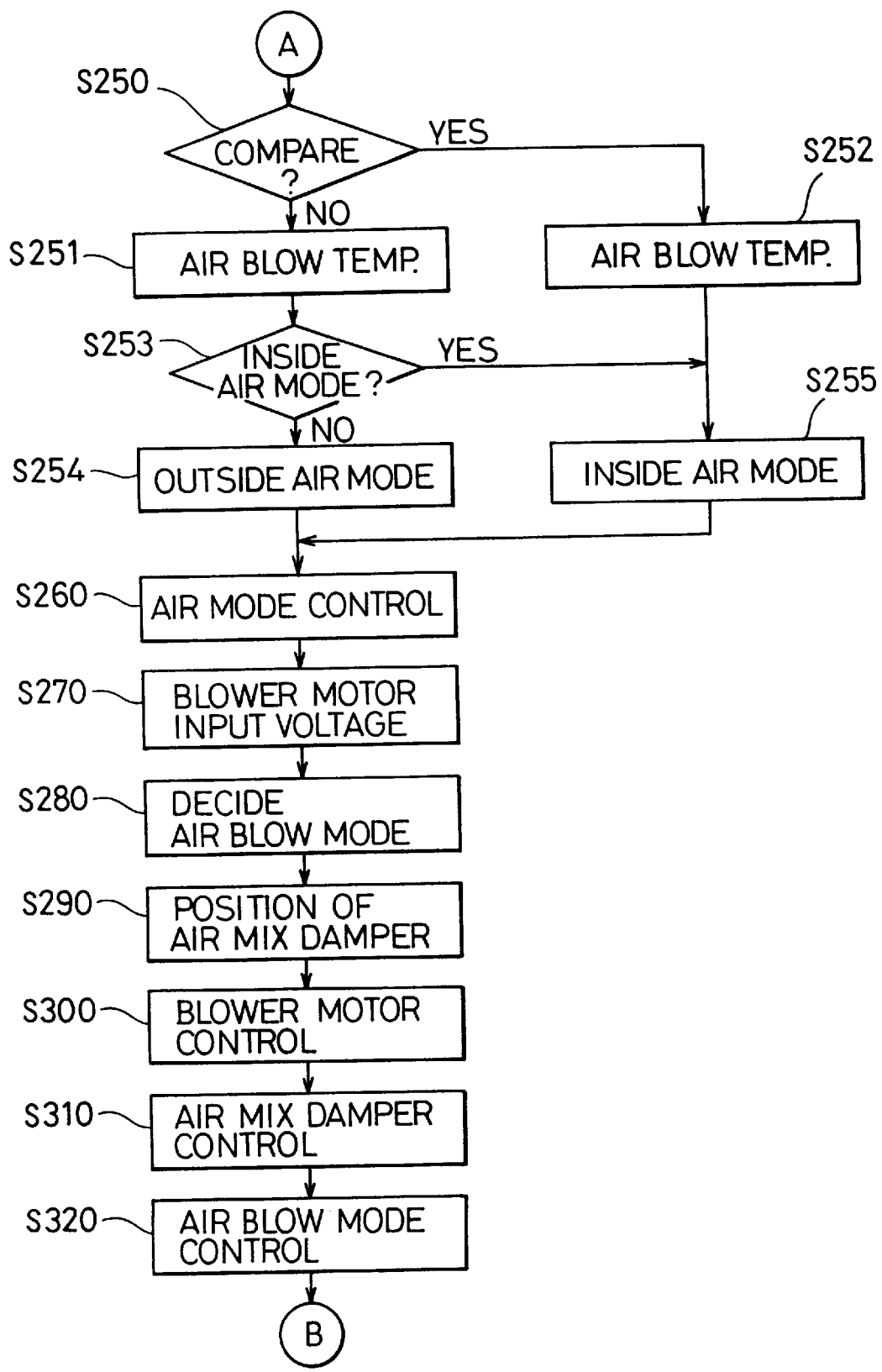
FIG. 14 is a flow chart of the operation of the control unit according to the fourth embodiment.

The operation of the control unit 20 is described below with reference to flow charts shown in FIGS. 13–15.

First, initialization is performed in step S200. Then, a desired temperature Tset set by the control panel 22, various values detected by the sensors including the inside-air temperature Tr, the outside-air temperature Tam, solar radiation value Ts, cooling air temperature Te, engine cooling water temperature Tw are read and stored in a memory (S210). Subsequently, an output voltage Gas of the gas sensor 10 and an output voltage of the humidity sensor Hum are read (S220). If the output voltage Gas is a maximum value up to the present, the output voltage Gas is memorized as a current reference level Gmax of the gas sensor 10. At the same time, an absolute humidity Hmax is calculated (in a way described below) from the output voltage Hum of the humidity sensor 21f and the outside temperature Tam (S231).

Then, a reference clean-air level Ls is calculated (S240). The output voltage Gas of the gas sensor 10 is compared with the reference clean-air level Ls (S250). If the output voltage Gas is equal to or higher than the reference clean air level Ls, step S250 provides NO and step S251 follows to calculate a blowing air temperature TAO. On the other hand, if the output voltage Gas is lower than the reference clean air level Ls, step S250 provides YES, and step S252 follows to calculate a blowing air temperature TAO. The blowing air temperature TAO is calculated by the following expression:

$$TAO = K_{SET} \cdot T_{SET} - Kr \cdot Tr - Kam \cdot Tam - Ks \cdot Ts + C \quad (11),$$

where $K_{SET}$, Kr, Kam and Ks are compensation gains, C is a constant.

Figure 16:
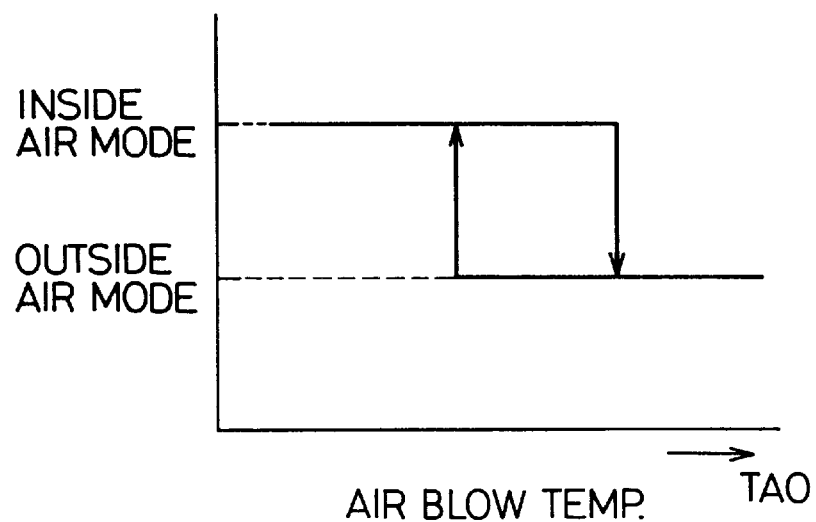
FIG. 16 is a graph showing relationship between the intake air modes and blowing air temperature.
Figure 17:
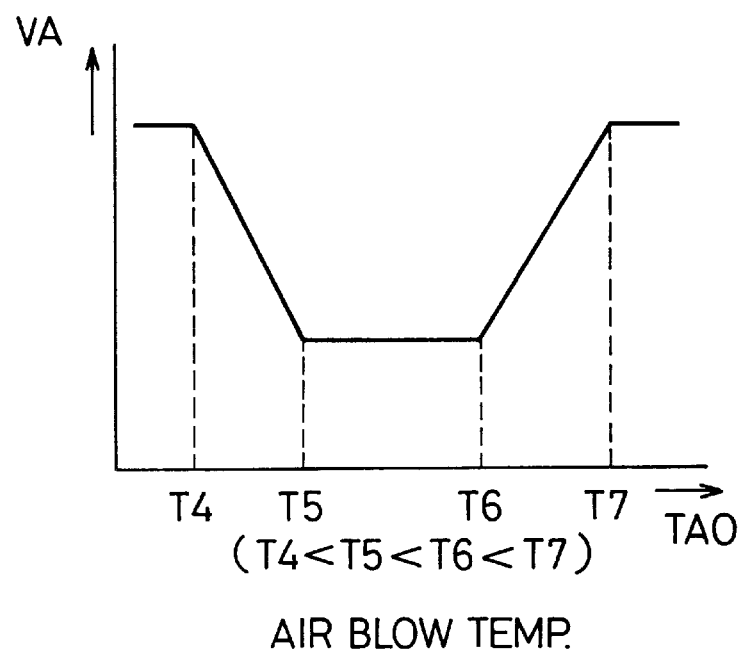
FIG. 17 is a graph showing relationship between voltage applied to a blower motor and the blowing air temperature.
Figure 18:
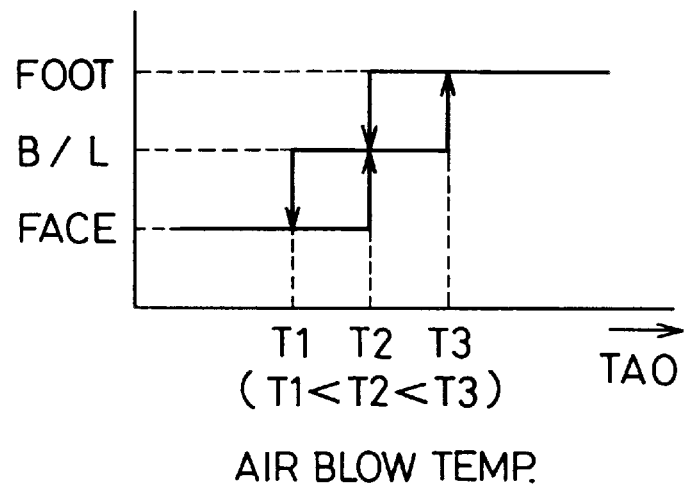
FIG. 18 is a graph showing relationship between blowing air modes and the blowing air temperature.

The air mode is decided according to the calculated blowing temperature TAO by a graph shown in FIG. 16 (S254 or S255). Then, the control unit 20 provides a control signal to drive the air-switching door 10 (S260). Subsequently, an air blower control voltage is decided according to the calculated blowing temperature TAO by a graph shown in FIG. 17 (S270). Then, an air blowing mode is decided based on the graph shown in FIG. 17 according to the blowing air temperature (S280). Subsequently, an open ratio SW of the air mix doors 32a is decided according to the calculated blowing air temperature TAO, the cooling air temperature Te and the engine-cooling-water temperature Tw by the following expression (S290):

$$SW = (TAO - Te)/(Tw - Te) \times 100 \ (\%) \quad (12)$$

Then, the motor driving circuit 20a is controlled to generate the air blower control voltage (S300), the servomotor 32b is controlled to move the air mix doors 32a to have the open ratio SW (S310), and the servomotor 35b is controlled to move the doors 33a and 35a to provide the air blowing mode decided in step S280 (S320).

Figure 19:
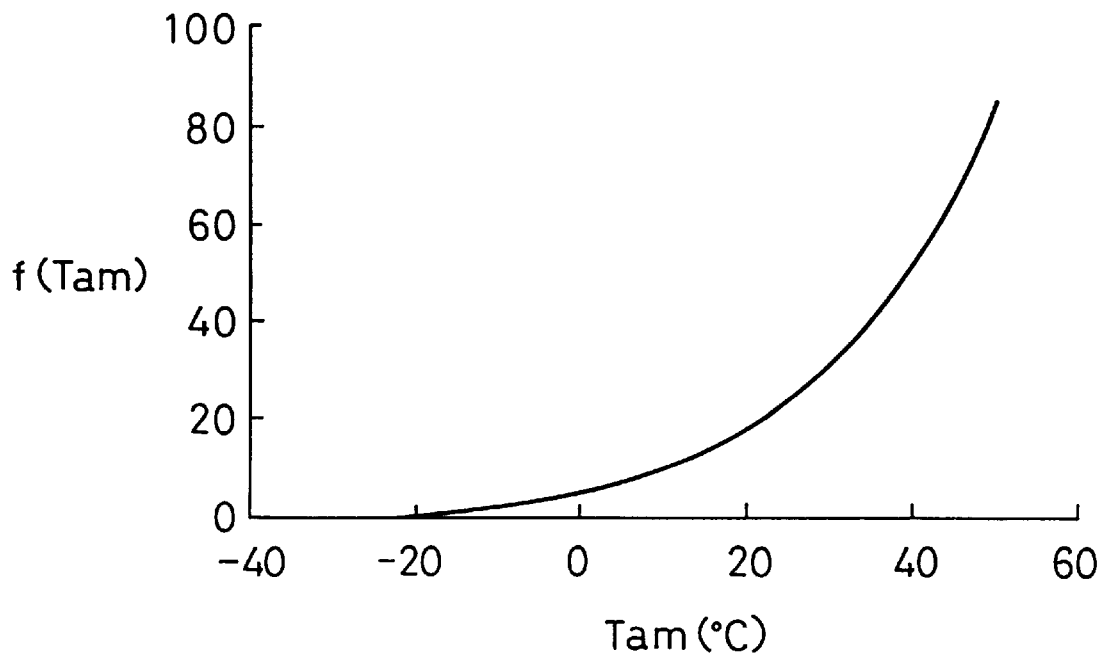
FIG. 19 is a graph showing relationship between outside air temperature and amounts of saturated vapor.

The absolute humidity Hmax is calculated in step S231 according to the following expression:

$$Hmax = f(Tam) \times Hum/100 \quad (13),$$

where f(Tam) is an amount of the saturated vapor of the outside-air at a temperature Tam, which is given from the characteristic curve shown in FIG. 19. The characteristic curve is stored in the microcomputer.

Figure 15:
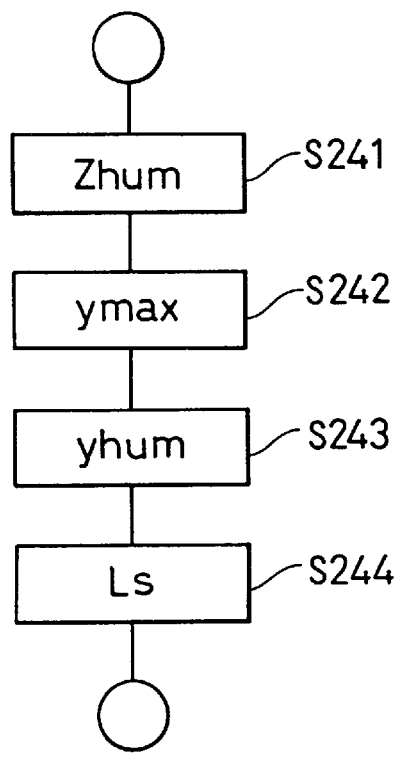
FIG. 15 is a flow chart of calculation of the reference clean air level to be detected.

The reference clean-air level Ls is calculated in step S240, which is composed of steps S241–S244 shown in FIG. 15.

Figure 20:
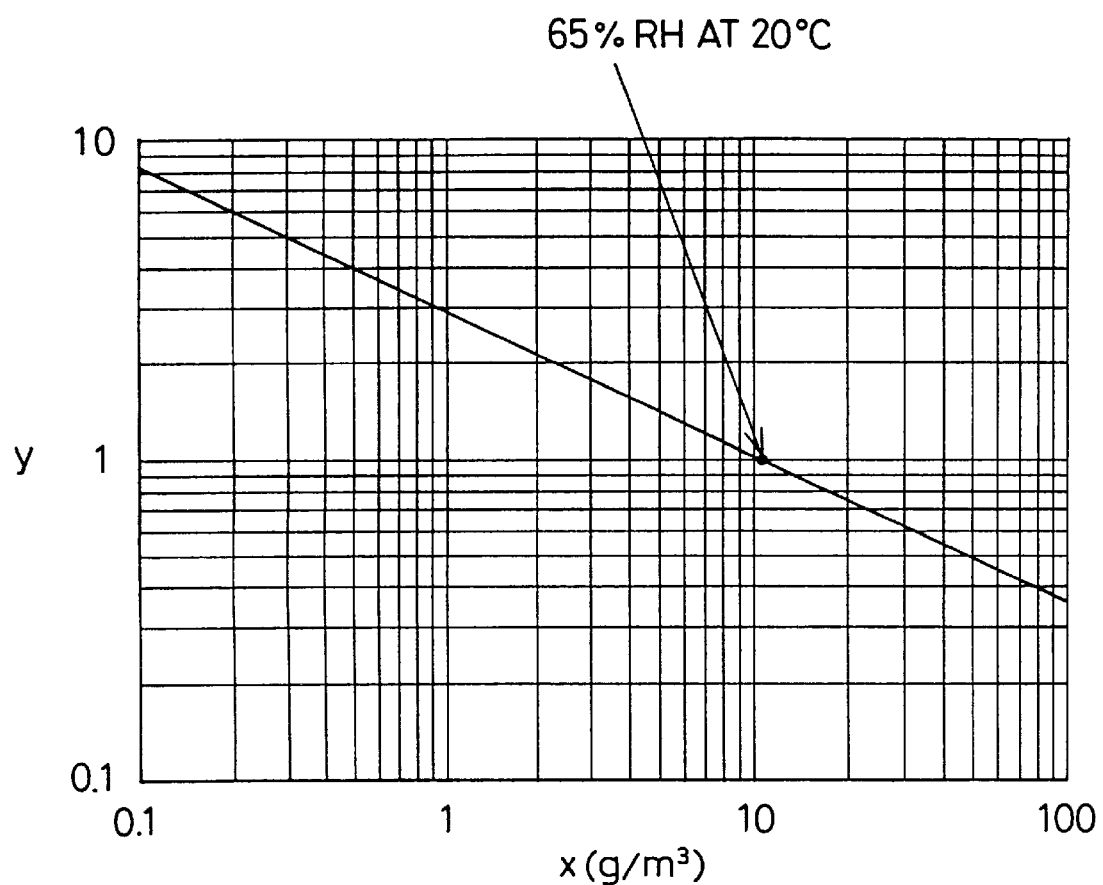
FIG. 20 is a graph showing relationship between the absolute humidity and the resistance ratio of a gas sensor.

The resistance ratio y of the gas sensor 10 changes as the absolute humidity x changes as shown in a graph in FIG. 20. They have the following relationship:

$$\log y = a \cdot \log x + b \quad (14),$$

where a and b are constant, for example, a=−0.45, and b=1.09 (with the resistance ratio 1 at 20° C. and 65% RH).

A current absolute humidity x is memorized as Zhum (step S241). Subsequently, the maximum absolute humidity Hmax, memorized last time, is substituted for x in the following expression to get a resistance ratio ymax (S242):

$$y = \exp(a \cdot \log + b) \quad (14')$$

The current absolute humidity Zhum is also substituted for x of the above expression (14') to get a resistance ratio yhum (S243). Then, the reference clean-air level Ls is calculated according to the following expression (S244):

$$Ls = Gmax \times [F - (ymax - yhum)/ymax] \quad (15),$$

where F is variable with the driver's feeling, e.g. 0.9–0.5.

Thus, even if the vehicle runs in the rain, the gas sensor 10 can detect the concentration of the noxious gas accurately so that the air mode can be changed adequately.

Variations

The humidity sensor 21f, which detects the relative humidity, can be replaced with a sensor which detects the absolute humidity. In this case, the calculation in step S231 can be omitted.

The absolute humidity can be estimated from the outside-air temperature and the rate of operation of the compressor used in the air conditioner without the humidity sensor. For example, the rate of the operation of the compressor is detected every certain period (e.g. 3 minutes). Then, a current outside-air temperature is compared to the outside-air temperature before the above period. If the outside-air temperature does not rise to a certain degree (e.g. 2° C.) and, also, the rate of the operation increases by a preset value, the reference clean-air level is lowered because it is estimated to be raining.

The wiper switch can be also replaced with the humidity sensor 21f. The operation of the wiper switch closely relates to rain. Thus, when the wiper switch is turned on, the reference clean-air level is lowered.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. An air conditioning system for a vehicle comprising:
   an air conditioner having a case, an inside-air inlet opening inside said vehicle, an outside-air inlet opening outside said vehicle and an air-switching door, said air-switching door controlling an amount of air introduced from said inside-air inlet and outside air-inlet to provide an outside air mode introducing outside air and an inside-air mode introducing inside air;
   first means for controlling said air switching door;
   second means, connected to said first means, for detecting a clean-air level of said outside air; and
   a vehicle speed sensor connected to said first means; wherein
   said first means controls said air-switching door to set to said outside-air mode when said clean-air level is higher than a reference level and to said inside-air mode when said clean-air level is not higher than said reference level; and
   said first means holds said inside-air mode until said vehicle speed becomes higher than a predetermined speed irrespective of said clean-air level.

2. An air conditioning system as claimed in claim 1, wherein
   said first means increases said reference level as said vehicle speed decreases.

3. An air conditioning system as claimed in claim 1 further comprising a humidity detecting means connected to said first means, wherein
   said first means changes said reference level in response to said humidity.

4. An air conditioning system as claimed in claim 3, wherein said air conditioner further comprising a refrigerant compressor and an outside-air temperature sensor; and
   said humidity detecting means comprises operation detecting means for detecting the rate of operation of said refrigerant compressor and estimation means for estimating a humidity of said outside air from an outside air temperature and said rate of operation of said refrigerant compressor.

5. An air conditioning system as claimed in claim 3, wherein
   said humidity detecting means comprises a humidity sensor; and
   said first means comprises level-changing means for changing said reference level in response to said detected humidity and said clean air level detected by said second means.

6. An air conditioning system as claimed in claim 3, wherein
   said humidity detecting means comprises a wiper switch for said vehicle; and
   said first means changes said reference level when said wiper switch is turned on.

7. An air conditioning system for a vehicle comprising:
   an air conditioner having a case, an inside-air inlet opening inside said vehicle, an outside-air inlet opening outside said vehicle and an air-switching door, said air-switching door controlling an amount of air introduced from said inside-air inlet and outside air-inlet to provide an outside air mode introducing outside air and an inside-air mode introducing inside air;
   first means for controlling said air switching door;
   second means, connected to said first means, for detecting a clean-air level of said outside air; and
   a vehicle speed sensor connected to said first means; wherein
   said first means controls said air-switching door to set to said outside-air mode when said clean-air level is higher than a reference level and to said inside-air mode when said clean-air level is not higher than said reference level; and
   said first means holds said inside-air mode for a predetermined period even if said vehicle speed becomes higher than a predetermined speed.

8. An air conditioning system as claimed in claim 7 further comprising a humidity detecting means connected to said first means, wherein
   said first means changes said reference level in response to said humidity.

9. An air conditioning system as claimed in claim 8, wherein said air conditioner further comprising a refrigerant compressor and an outside-air temperature sensor; and
   said humidity detecting means comprises operation detecting means for detecting the rate of operation of said refrigerant compressor and estimation means for estimating a humidity of said outside air from an outside air temperature and said rate of operation of said refrigerant compressor.

10. An air conditioning system as claimed in claim 8, wherein
    said humidity detecting means comprises a humidity sensor; and
    said first means comprises level-changing means for changing said reference level in response to said detected humidity and said clean air level detected by said second means.

11. An air conditioning system as claimed in claim 8, wherein
    said humidity detecting means comprises a wiper switch for said vehicle; and
    said first means changes said reference level when said wiper switch is turned on.

12. An air conditioning system for a vehicle comprising:
    an air conditioner having a case, an inside-air inlet opening inside said vehicle, an outside-air inlet opening outside said vehicle and an air-switching door, said air-switching door controlling an amount of air introduced from said inside-air inlet and outside air-inlet to provide an outside air mode introducing outside air and an inside-air mode introducing inside air;
    first means for controlling said air switching door;
    second means, connected to said first means, for detecting a clean-air level of said outside air; and a vehicle speed sensor connected to said first means; wherein said first means controls said air-switching door to set to said outside-air mode when said clean-air level is higher than a reference level and to said inside-air mode when said clean-air level is not higher than said reference level; and said first means holds said inside-air mode for a predetermined period from when a vehicle speed lower than a predetermined speed is detected, irrespective of said clean-air level.

13. An air conditioning system as claimed in claim 12 further comprising a humidity detecting means connected to said first means, wherein said first means changes said reference level in response to said humidity.

14. An air conditioning system as claimed in claim 13, wherein said air conditioner further comprising a refrigerant compressor and an outside-air temperature sensor; and said humidity detecting means comprises operation detecting means for detecting the rate of operation of said refrigerant compressor and estimation means for estimating a humidity of said outside air from an outside air temperature and said rate of operation of said refrigerant compressor.

15. An air conditioning system as claimed in claim 13, wherein said humidity detecting means comprises a humidity sensor; and said first means comprises level-changing means for changing said reference level in response to said detected humidity and said clean air level detected by said second means.

16. An air conditioning system as claimed in claim 13, wherein said humidity detecting means comprises a wiper switch for said vehicle; and said first means changes said reference level when said wiper switch is turned on.

17. An air conditioning system for a vehicle comprising:

an air conditioner having a case, an inside-air inlet opening inside said vehicle, an outside-air inlet opening outside said vehicle and an air-switching door, said air-switching door controlling an amount of air introduced from said inside-air inlet and outside air-inlet to provide an outside air mode introducing outside air and an inside-air mode introducing inside air;

first means for controlling said air switching door;

second means, connected to said first means, for detecting a clean-air level of said outside air; and a humidity detecting means connected to said first means; wherein said first means controls said air-switching door to set to said outside-air mode when said clean-air level is higher than a reference level and to said inside-air mode when said clean-air level is not higher than said reference level;

said first means holds said inside-air mode for a predetermined period from when said clean-air level becomes higher than said reference level; and said first means changes said reference level in response to said humidity.

18. An air conditioning system as claimed in claim 17, wherein said air conditioner further comprising a refrigerant compressor and an outside-air temperature sensor; and said humidity detecting means comprises operation detecting means for detecting the rate of operation of said refrigerant compressor and estimation means for estimating a humidity of said outside air from an outside air temperature and said rate of operation of said refrigerant compressor.

19. An air conditioning system as claimed in claim 17, wherein said humidity detecting means comprises a humidity sensor; and said first means comprises level-changing means for changing said reference level in response to said detected humidity and said clean air level detected by said second means.

20. An air conditioning system as claimed in claim 17, wherein said humidity detecting means comprises a wiper switch for said vehicle; and said first means changes said reference level when said wiper switch is turned on.

21. An air conditioning system for a vehicle comprising:

an air conditioner having a case, an inside-air inlet opening inside said vehicle, an outside-air inlet opening outside said vehicle and an air-switching door, said air-switching door controlling an amount of air introduced from said inside-air inlet and outside air-inlet to provide an outside-air mode introducing outside air, an inside-air mode introducing inside air and a medium-air mode; and first means for controlling said air switching door;

second means, connected to said first means, for detecting a clean-air level of said outside air;

wherein said first means controls said air-switching door to set to said inside-air mode when said clean-air level is not higher than a reference level, and to said medium-air mode far a certain time when said clean-air level is higher than said reference level before said switching door is set to said outside-air mode.

22. An air conditioning system as claimed in claim 21, wherein said first means holds said inside-air mode for a predetermined period from when said clean-air level becomes higher than said reference level.

23. An air conditioning system as claimed in claim 21, wherein said first means changes said medium-air mode to said outside-air mode when said clean-air level continues for a predetermined period.

24. An air conditioning system as claimed in claim 21 further comprising humidity detecting means connected to said first means, for detecting a humidity of said outside air, wherein said first means changes said reference level in response to said detected humidity.

25. An air conditioning system as claimed in claim 24, wherein said air conditioner further comprising a refrigerant compressor and an outside-air temperature sensor; and said humidity detecting means comprises operation detecting means for detecting the rate of operation of said refrigerant compressor and estimation means for estimating a humidity of said outside air from an outside air temperature and said rate of operation of said refrigerant compressor.

26. An air conditioning system as claimed in claim 24, wherein said humidity detecting means comprises a humidity sensor; and said first means comprises level-changing means for changing said reference level in response to said detected humidity and said clean air level detected by said second means.

27. An air conditioning system as claimed in claim 24, wherein said humidity detecting means comprises a wiper switch for said vehicle; and said first means changes said reference level when said wiper switch is turned on.

* * * * *

UNITED STATES PATENT AND TRADEMARK OFFICE
CERTIFICATE OF CORRECTION

PATENT NO. : 5,946,923

DATED : September 7, 1999

INVENTOR(S) : Katsuhiko Samukawa et al

It is certified that error appears in the above-identified patent and that said Letters Patent is hereby corrected as shown below:

Title Page, [30] Foreign Priority, Priority Appln. JP No. 9-024150
Date "Feb. 6, 1987" should be --Feb. 6, 1997--

Col. 1, line 34, delete "is" and substitute --are-- therefor

Col. 4, line 54, "on" should be --On--

Col. 4, line 61, "140" should be --S140--

Col. 4, line 64, "become" should be --becomes--

Col. 4, line 66, "130" should be --S130--

Col. 5, line 1, "Ti" should be --T1--

Col. 5, line 6, delete "is" and substitute --are-- therefor

Col. 5, line 9, "No" should be --NO--

Col. 5, line 14, delete "and"

Col. 5, line 26, "80" should be --S80--;

Col. 5, line 63, "503" should be --S503--;

UNITED STATES PATENT AND TRADEMARK OFFICE
CERTIFICATE OF CORRECTION

PATENT NO. : 5,946,923

DATED : September 7, 1999

INVENTOR(S) : Katsuhiko Samukawa et al

It is certified that error appears in the above-identified patent and that said Letters Patent is hereby corrected as shown below:

Col. 6, line 3, "506" should be --S506--

Col. 6, line 7, after "in" insert --step--

Col. 6, line 16, "509" should be --S509--

Col. 12, line 48, "far" should be --for--

Signed and Sealed this

Eighteenth Day of July, 2000

*Attest:*

Q. TODD DICKINSON

*Attesting Officer*   *Director of Patents and Trademarks*